July 6, 1943.  C. F. JENKINS ET AL  2,323,662
RAILWAY MOTOR FRAME
Filed Oct. 28, 1942   2 Sheets-Sheet 1

WITNESSES:

INVENTORS
George A. Moore and
Charles F. Jenkins.
BY
ATTORNEY

July 6, 1943.  C. F. JENKINS ET AL  2,323,662
RAILWAY MOTOR FRAME
Filed Oct. 28, 1942  2 Sheets-Sheet 2

WITNESSES:
N. F. Susan
T. P. Lyle

INVENTORS
George A. Moore and
Charles F. Jenkins.
BY O. B. Buchanan
ATTORNEY

Patented July 6, 1943

2,323,662

UNITED STATES PATENT OFFICE 2,323,662

RAILWAY MOTOR FRAME

Charles F. Jenkins, Laughlintown, and George A. Moore, Edgewood, Pa., assignors to Westinghouse Electric & Manufacturing Company, East Pittsburgh, Pa., a corporation of Pennsylvania Application October 28, 1942, Serial No. 463,594

10 Claims. (Cl. 172—286)

The present invention relates to electric motors, and more particularly to a frame construction for electric railway motors.

The invention relates particularly to railway motors of the so-called axle-hung type, in which the motor is supported directly on the axle which it drives, and a pinion on the motor shaft meshes with a gear on the axle. The design of such motors is subject to rather strict limitations imposed by the dimensions of the space within which they must be mounted. The diameter of the gear mounted on the axle is limited by the diameter of the wheel, while the pinion diameter and gear ratio are determined by the distance between the centers of the axle and of the motor shaft, and by the requirements for proper meshing of the gear and pinion. If the distance between the axle and the motor shaft is increased, the size of the pinion increases and the gear ratio is decreased, so that the motor must be designed to operate at a lower speed. When the speed of the motor is decreased, the diameter of the armature must be increased in order to develop the same horsepower. The diameter of the motor is limited, however, by the available space, since it is customary to mount two motors side by side in the same truck, driving the front and rear axles, respectively, and the maximum diameter of the motors is limited, therefore, by the length of the truck, which must not be too great or it will be unable to negotiate curves. The maximum diameter of the motors is, of course, also limited by the necessary clearance above the ground. For these reasons, it is desirable to make the spacing between the motor shaft and the axle as small as possible, so that the pinion diameter can be made small, and a smaller, high speed motor design used. The use of a smaller pinion also has the advantage of materially increasing the tractive effort.

In order to obtain this desirable small spacing between motor shaft and axle, motors of this type have sometimes been designed with one of the interpoles omitted, and a bearing seat for the axle recessed or depressed into the motor frame in the space which would normally be occupied by the omitted interpole. This construction reduces the distance between the motor shaft and axle, but the interior of the motor frame is not circular, because of the depressed axle seat, and the operation of machining the interior of the frame to provide the seats for the pole pieces and field coils is quite difficult and expensive. This has been a serious disadvantage in the use of this type of frame construction.

The principal object of the present invention is to provide a frame construction for electric railway motors of the axle-hung type which can be produced rapidly and inexpensively, and in which the distance between the motor shaft and the axle can be kept to a minimum.

A further object of the invention is to provide a frame construction for axle-hung railway motors of the type in which the axle bearing seat is depressed into the frame, and in which the necessary machining of the frame for the pole piece and coil seats can be performed in a single and relatively inexpensive operation.

A more specific object of the invention is to provide a frame construction for railway motors of the axle-hung type in which inwardly depressed portions are provided at each end of the frame to form axle bearing seats, and in which the frame is formed with an opening between these axle bearing seats, so that the portion of the frame on which the pole piece and coil seats are formed has a cylindrical interior surface which can readily be machined in a single operation on a boring mill. After the frame has been machined, the opening is closed by an insert conforming in shape to the axle bearing seats which can be permanently welded, or otherwise secured, in place.

Still another object of the invention is to provide a frame construction for axle-hung railway motors in which the frame is provided with inwardly depressed portions at each end to form axle bearing seats, with an opening between them which is closed by a suitably shaped insert after the interior of the frame has been machined, and in which the depressed portions of the frame are designed so that there is a sufficient cross-section of metal in the region of the opening and axle bearing seats to provide an adequate path for the magnetic flux of the motor.

The invention will be more fully understood from the following detailed description, taken in connection with the accompanying drawings, in which.

Figure 1:
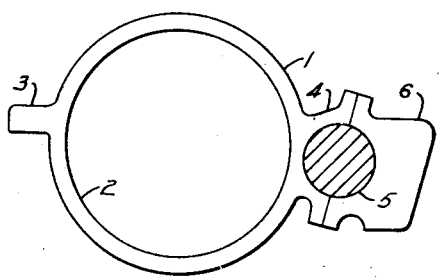
Figures 1 and 2 are diagrammatic views, in end elevation, of two types of railway motor frame constructions which have been used in the prior art.

Fig. 1 shows diagrammatically a type of axle-hung railway motor frame in which the frame member 1 is completely circular, and has a cylindrical interior surface 2 upon which the pole pieces and field coils are seated. The frame also has a diagrammatically indicated suspension lug 3 at one side, and an axle bearing seat 4 on the other side. When the completed motor is in use, the frame rests on an axle 5, and is held in position by a suitable cap member 6. Since the interior surface of this type of frame is a complete cylinder, it is obvious that the pole pieces and coil seats can readily be machined in a single operation on a boring mill, or by equivalent means. This type of construction, however, has the disadvantage that there is a relatively great distance between the axis of the motor shaft and the axis of the axle 5.

Figure 2:
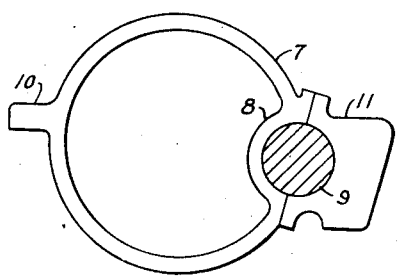

Fig. 2 shows diagrammatically a type of motor frame which has been used to reduce the distance between the axis of the motor shaft and the axis of the axle, in order to obtain the advantages of such shorter distance, as discussed above. In this type of construction, the frame 7 has an inwardly depressed or recessed portion 8 at one side which forms a bearing seat for the axle 9. The frame has a suspension lug 10 and is held in place on the axle by a cap member 11. It will be apparent that since the axle seat is depressed or recessed into the frame, the distance between the axle and the shaft of the motor is materially reduced, so that a smaller pinion and smaller, higher speed motor can be used. The interior surface of the frame 7, however, is not completely cylindrical, because of the inwardly depressed portion 8, and the pole piece and coil seats in a frame of this construction cannot be machined in the manner that is possible in the frame of Fig. 1, but must be machined on a shaper, or similar machine tool, which is a relatively slow and time-consuming operation, and very materially increases the cost of the motor.

The purpose of the present invention is to make it possible to use the general type of frame construction shown in Fig. 2, with its advantage of reduced distance between the motor shaft and axle, while at the same time the frame can be machined by the rapid and relatively inexpensive method which it has previously been possible to use only on a completely circular frame such as that of Fig. 1.

Figure 3:
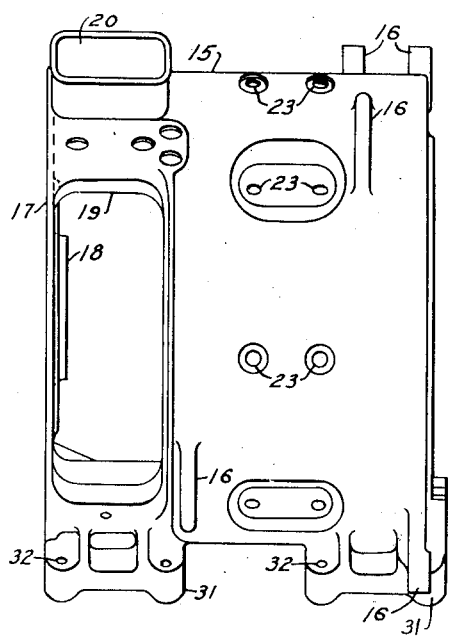
Fig. 3 is a side elevation of a railway motor frame embodying the present invention.
Figure 4:
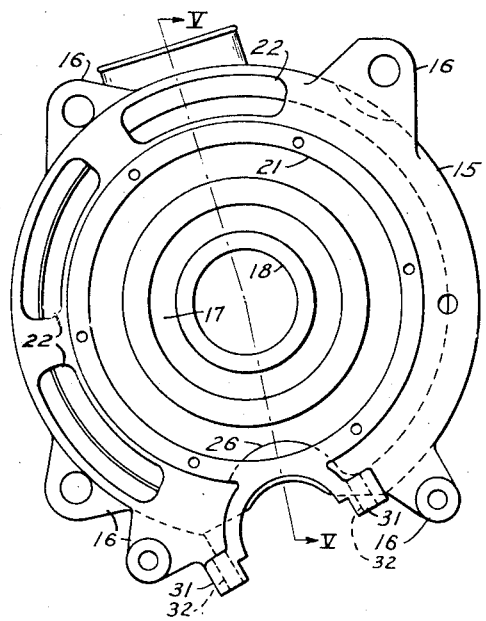
Fig. 4 is an end elevation of the motor frame of Fig. 3.

Figs. 3 and 4 show, in side and end elevation, respectively, a motor frame embodying the present invention. It is to be understood that the invention is applicable to any railway motor of the axle-hung type, and is not restricted to the particular details of frame construction utilized in the motor selected for the purpose of illustration. This particular motor has a cast frame 15 of generally cylindrical shape, which has suitable suspension lugs 16 formed on it. The commutator end of the frame is cast with an integral end-bracket 17 having a central boss 18 adapted to receive a suitable bearing housing for supporting the shaft of the motor. Openings 19 may be provided at the commutator end of the frame to permit access to the commutator and brushes of the completed motor, these openings being normally closed by suitable covers when the motor is in operation, and an air intake opening 20 may also be provided at the commutator end. The pinion end of the motor has a sufficiently large opening 21 to permit the armature to be inserted into the frame, and if desired, air discharge outlets 22 may be formed in this end of the motor. Suitable holes 23 are drilled in the central part of the body of the frame 15 to receive mounting bolts for mounting the main pole pieces and interpoles of the motor. These details of construction are not essential features of the present invention, but are merely typical of the design of railway motors, and may be varied to suit the requirements of a particular motor design. It is also to be understood that although a cast frame has been described, the invention is equally applicable to motor frames of fabricated construction, in which the frame is built up of plates which are rolled and cut to the proper size and shape and welded together.

The lower part of the frame 15, as seen in the drawings, is shaped to provide bearing seats for the axle on which it is to be supported. Thus, at the commutator end of the frame, an inwardly depressed or recessed portion 25 is formed, and a similar depressed portion 26 is formed at the pinion end of the frame. These depressed portions 25 and 26 are semi-cylindrical in cross-section, and their external surfaces are bored to fit the particular size of axle for which the motor is intended.

Figure 7:
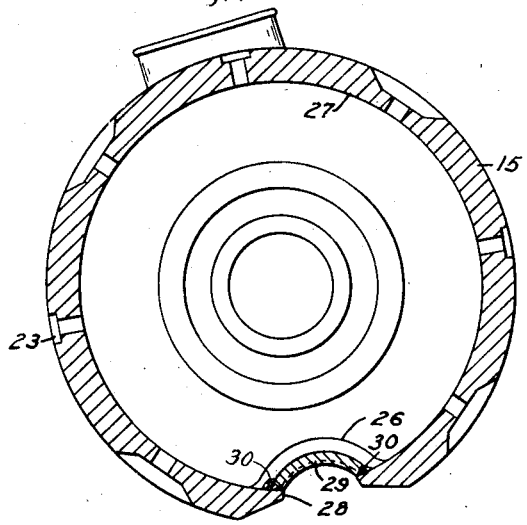
Fig. 7 is a transverse sectional view approximately on the line VII—VII of Fig. 5.

The interior of the frame 15 has a cylindrical internal surface 27 on which the pole pieces and field coils of the completed motor are to be seated. This cylindrical surface 27 is positioned intermediate the depressed portions 25 and 26, which are on opposite sides of the central portion of the frame in which the pole pieces are to be supported, and in casting or fabricating the frame, a generally rectangular opening 28 is formed in the cylindrical surface 27, the opening 28 being axially aligned with the depressed portions 25 and 26, and extending for the entire distance between them. Thus, as clearly seen in Fig. 7, the frame 15 has a completely cylindrical interior surface 27 between the depressed portions 25 and 26, the cylindrical surface being interrupted only by the opening 28 at one side thereof. Therefore, the surface 27, which forms the pole piece and coil seat for the field poles of the motor can easily and rapidly be machined in a single operation or a boring mill, thus effecting a great saving in time and cost over the expensive shaper operation which was previously necessary in machining frames of this general type, as explained above in connection with Fig. 2.

Figure 8:
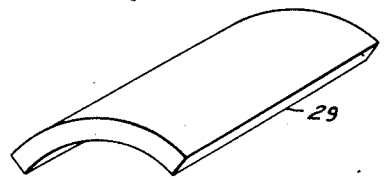
Fig. 8 is a perspective view of an insert member.

After the interior of the frame 15 has been machined, the opening 28 is closed by a suitable insert member 29. As shown in Fig. 8, the insert 29 is preferably in the shape of a segment of a cylinder, having the same curvature as the semi-cylindrical depressed portion 25 and 26. The insert member 29 is made of the proper size to completely close the opening 28, and it is welded in position in the opening along all four sides, as indicated at 30. Thus, the interior of the motor frame 15 is completely closed against the entrance of dirt or grease, and since the insert member 29 conforms in shape to the depressed portions 25 and 26, an axle bearing seat which extends for the entire length of the frame is provided, as is customary in this type of frame construction. Suitable lugs 31 may be provided adjacent each of the depressed portions 25 and 26, with holes 32 for the reception of bolts for securing axle bearing caps of any desired type in position to hold the motor in place on the axle.

Figure 5:
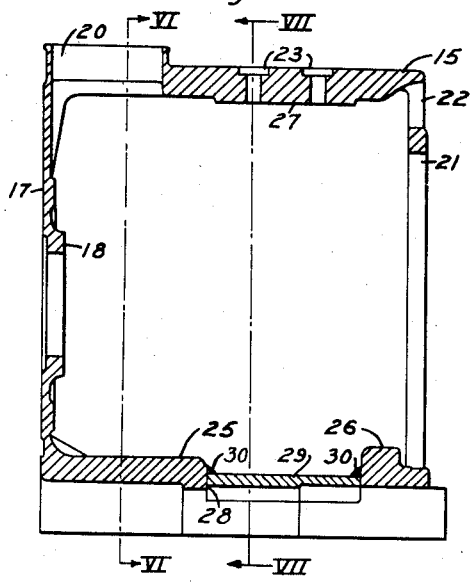
Fig. 5 is a longitudinal sectional view approximately on the line V—V of Fig. 4.
Figure 6:
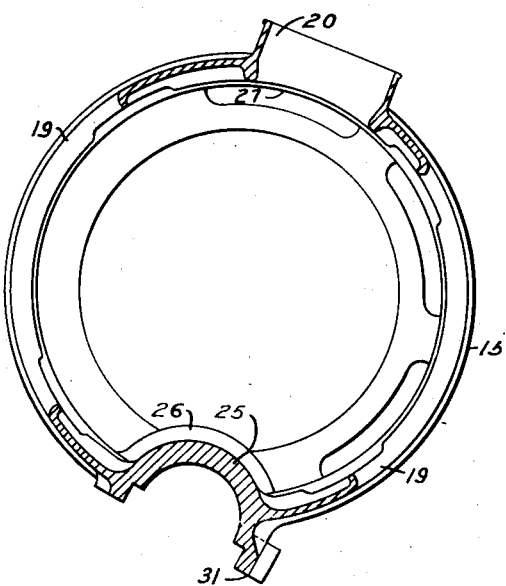
Fig. 6 is a transverse sectional view approximately on the line VI—VI of Fig. 5.

Since the central portion 15 of the frame, in which the opening 28 is formed, supports the main field pole pieces and interpoles, this portion of the frame carries the magnetic flux of the motor field, and it must be made of sufficient radial thickness to carry this flux without exceeding the permissible flux density. For this reason, the frame 15 in the region of the cylindrical surface 27 is made rather thick radially, as clearly shown in Figs. 5 and 7. This portion of the frame is interrupted, however, by the opening 28, and the insert member 29, which ordinarily is relatively thin as compared to the frame itself, and which does not provide a sufficient cross-section of metal to carry the magnetic flux. For this reason, the depressed portions 25 and 26 of the frame are made thicker radially than the adjacent portions of the frame, and are considerably thicker than would be required merely by considerations of mechanical strength. This increased thickness of the portions 25 and 26 of the frame provides an adequate path for the magnetic flux of the motor, so that the provision of the opening 28 and the relatively thin insert member 29 does not adversely affect the magnetic circuit of the machine. The extra thickness of the portions 25 and 26 also has another advantage in that it increases the rigidity of the frame on each side of the opening 28, so that any tendency for the frame to be distorted by the welding operation when the insert 29 is placed in position is prevented, the portions 25 and 26 serving to brace the frame against the distortion which might otherwise be caused. The use of a relatively thin insert member 29 also reduces the tendency to distort the frame so that there is substantially no danger of its being distorted from the correct shape by the welding operation.

It should now be apparent that a frame construction has been provided for an electric railway motor in which the distance between the motor shaft and the axle is reduced to a minimum, but in which the frame may be machined in the rapid and inexpensive way which has only been possible previously for the completely circular frame construction of the type shown in Fig. 1. It is to be understood that although a specific embodiment of the invention has been illustrated and described, it is not limited to this exact construction. Thus, the invention is equally applicable to either cast or fabricated frames, and the detailed design of the frame may be modified in any manner required for a particular installation. Various other modifications are also possible. The insert member 29 may, in some cases, be made of extremely thin sheet metal, since its primary purpose is to close the frame against the entrance of dirt or grease, and if the depressed portions 25 and 26 of the frame can be made thick enough to give the necessary cross section to provide an adequate magnetic path, the insert member could be made of very thin sheet metal or other material having the necessary rigidity. It will be apparent to those skilled in the art that various other changes might also be made without departing from the spirit of the invention.

It is to be understood, therefore, that although a specific embodiment of the invention has been shown and described, it is not limited to this particular construction, but that it includes all equivalent embodiments and modifications which come within the scope of the appended claims.

We claim as our invention:

1. In an electric railway motor, a generally cylindrical frame member, said frame member having an opening therein intermediate its ends, said frame member also having inwardly depressed portions on each side of said opening and axially aligned therewith to provide axle bearing seats, and means for closing said opening.

2. In an electric railway motor, a generally cylindrical frame member, said frame member having an opening therein intermediate its ends, said frame member also having inwardly depressed portions on each side of said opening and axially aligned therewith to provide axle bearing seats, said depressed portions having greater radial thickness than the adjacent parts of the frame member, and means for closing said opening.

3. In an electric railway motor, a generally cylindrical frame member, said frame member having an opening therein intermediate its ends, said frame member also having inwardly depressed portions on each side of said opening and axially aligned therewith to provide axle bearing seats, and a member closing said opening, said member conforming in shape to said depressed portions of the frame and being rigidly secured in position in said opening.

4. In an electric railway motor, a generally cylindrical frame member, said frame member having an opening therein intermediate its ends, said frame member also having inwardly depressed portions on each side of said opening and axially aligned therewith to provide axle bearing seats, said depressed portions having greater radial thickness than the adjacent parts of the frame member, and a member closing said opening, said member conforming in shape to said depressed portions of the frame and being rigidly secured in position in said opening.

5. In an electric railway motor, a generally cylindrical frame member, said frame member having an inwardly depressed portion adjacent each end thereof, said depressed portions being arcuate in cross-section, said frame member also having a cylindrical internal surface intermediate said depressed portions, and having an opening in said surface extending between the depressed portions and aligned therewith, and means for closing said opening.

6. In an electric railway motor, a generally cylindrical frame member, said frame member having an inwardly depressed portion adjacent each end thereof, said depressed portions being arcuate in cross-section, and being of greater radial thickness than the adjacent portions of the frame member, said frame member also having a cylindrical internal surface intermediate said depressed portions, and having an opening in said surface extending between the depressed portions and aligned therewith, and means for closing said opening.

7. In an electric railway motor, a generally cylindrical frame member, said frame member having an inwardly depressed portion adjacent each end thereof, said depressed portions being arcuate in cross-section, said frame member also having a cylindrical internal surface intermediate said depressed portions, and having an opening in said surface extending between the depressed portions and aligned therewith, and an arcuate member rigidly secured in said opening, said member having the same curvature as said depressed portions of the frame member and completely closing the opening.

8. In an electric railway motor, a generally cylindrical frame member, said frame member having an inwardly depressed portion adjacent each end thereof, said depressed portions being arcuate in cross-section, and being of greater radial thickness than the adjacent portions of the frame member, said frame member also having a cylindrical internal surface intermediate said depressed portions, and having an opening in said surface extending between the depressed portions and aligned therewith, and an arcuate member rigidly secured in said opening, said member having the same curvature as said depressed portions of the frame member and completely closing the opening.

9. In an electric railway motor, a generally cylindrical frame member, said frame member having an inwardly depressed portion adjacent each end thereof, said depressed portions being arcuate in cross-section, said frame member also having a cylindrical internal surface intermediate said depressed portions, and having an opening in said surface extending between the depressed portions and aligned therewith, and an arcuate member rigidly secured in said opening and completely closing the opening, said depressed portions of the frame member having greater radial thickness than the adjacent portions of the frame member and said arcuate member being relatively thinner.

10. In an electric railway motor, a generally cylindrical frame member, said frame member having an inwardly depressed portion adjacent each end thereof, said depressed portions being arcuate in cross-section, said frame member also having a cylindrical internal surface intermediate said depressed portions, and having an opening in said surface extending between the depressed portions and aligned therewith, and an arcuate member rigidly secured in said opening and completely closing the opening, said depressed portions of the frame member having greater radial thickness than the adjacent portions of the frame member and said arcuate member being relatively thinner, the combined cross-sections of the depressed portions and the arcuate member being such as to provide a path for magnetic flux which is equivalent to the magnetic path provided by the frame member in the region of said cylindrical surface.

CHARLES F. JENKINS.
GEORGE A. MOORE.